US012615280B2

(12) United States Patent
Nyamwange et al.

(10) Patent No.: US 12,615,280 B2
(45) Date of Patent: Apr. 28, 2026

(54) DETECTING POLYMORPHIC BOTNETS USING AN IMAGE RECOGNITION PLATFORM

(71) Applicant: Bank of America Corporation, Charlotte, NC (US)

(72) Inventors: Elvis Nyamwange, Little Elm, TX (US); Erik Dahl, Newark, DE (US); Brian Jacobson, Los Angeles, CA (US); Pratap Dande, Saint Johns, FL (US); Hari Vuppala, Charlotte, NC (US); Rahul Yaksh, Austin, TX (US); Rahul Phadnis, Charlotte, NC (US); Amer Ali, Jersey City, NJ (US); Sailesh Vezzu, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 181 days.

(21) Appl. No.: 18/224,902

(22) Filed: Jul. 21, 2023

(65) Prior Publication Data

US 2025/0030717 A1     Jan. 23, 2025

(51) Int. Cl.
*H04L 9/00* (2022.01)
*H04L 9/40* (2022.01)

(52) U.S. Cl.
CPC ...... *H04L 63/1433* (2013.01); *H04L 63/1416* (2013.01)

(58) Field of Classification Search
CPC .................... H04L 63/1433; H04L 63/1416
USPC .......................................................... 726/23
See application file for complete search history.

(56) References Cited

U.S. PATENT DOCUMENTS

| | | | |
|---|---|---|---|
| 11,038,906 B1 * | 6/2021 | Bingham | ............ H04L 63/1425 |
| 11,075,934 B1 | 7/2021 | Aldhaheri et al. | |
| 11,102,238 B2 | 8/2021 | Ackerman et al. | |
| 11,126,679 B2 | 9/2021 | Shaabani et al. | |
| 11,463,462 B2 * | 10/2022 | Luo | ....................... G06F 18/214 |
| 11,586,733 B2 | 2/2023 | El-Moussa et al. | |
| 11,611,532 B1 | 3/2023 | Haefner | |
| 11,611,580 B1 | 3/2023 | Sharifi Mehr et al. | |
| 11,665,185 B2 | 5/2023 | Derley et al. | |
| 11,706,246 B2 | 7/2023 | Du | |
| 11,706,251 B2 | 7/2023 | Young et al. | |
| 2010/0107261 A1 * | 4/2010 | Nagoya | ............... H04L 63/1416 |
| | | | 726/30 |

(Continued)

*Primary Examiner* — Christopher J Brown
(74) *Attorney, Agent, or Firm* — Banner & Witcoff, Ltd.

(57) ABSTRACT

Arrangements for detecting polymorphic botnets using a pattern matching engine are provided. The platform may train a pattern matching engine to generate image pattern statuses based on a training set of historical image patterns. The platform may automatically generate real-time interaction information based on monitoring interactions between user devices and cloud platforms. The platform may generate a potentially malicious image pattern based on the real-time interaction information. The platform may then input the image pattern into the pattern matching engine to generate an image pattern status for the image pattern. The platform may store the image pattern to a pattern storage repository. Based on identifying the image pattern as malicious, the platform may initiate a security action. The platform may update the pattern matching engine based on the image pattern and its image pattern status to detect future polymorphic botnet attacks.

20 Claims, 8 Drawing Sheets

(56)                    References Cited

U.S. PATENT DOCUMENTS

| | | | |
|---|---|---|---|
| 2014/0310811 A1* | 10/2014 | Hentunen | H04L 63/145 |
| | | | 726/23 |
| 2016/0127408 A1* | 5/2016 | Miu | H04L 63/1458 |
| | | | 726/25 |
| 2020/0007575 A1* | 1/2020 | Meriot | H04L 63/1458 |
| 2021/0182397 A1 | 6/2021 | Karnik et al. | |
| 2021/0200864 A1 | 7/2021 | Rudnik | |
| 2023/0098508 A1 | 3/2023 | Mishra et al. | |
| 2023/0115982 A1 | 4/2023 | Lin et al. | |
| 2023/0140533 A1 | 5/2023 | Zavdi | |
| 2023/0177613 A1 | 6/2023 | Crabtree et al. | |
| 2023/0179616 A1 | 6/2023 | Rahmes et al. | |
| 2023/0231857 A1 | 7/2023 | Neupane et al. | |
| 2023/0231860 A1 | 7/2023 | Tian et al. | |
| 2023/0231877 A1 | 7/2023 | Lam | |
| 2023/0231878 A1 | 7/2023 | Chechik et al. | |

* cited by examiner

300

Botnet Alert Interface

Notification: Malicious Image Pattern Detected by
Pattern Recognition Platform

Impacted Target: First User Device

Impacted Network: Cloud Platform 1

Impacted Resource: Resource 1

Suggested Remedy: Segmentation of First User Device

Initiate Suggested Remedy?

Yes                                 No

DETECTING POLYMORPHIC BOTNETS USING AN IMAGE RECOGNITION PLATFORM

BACKGROUND

Aspects of the disclosure relate to detecting polymorphic robot networks (i.e. "botnets"). In some instances, a system may include a plurality of applications interfacing with a cloud-based network comprised of a plurality of virtual cloud resources. In some examples, the virtual cloud resources and/or the cloud-based network itself may be at risk from cybersecurity threats, such as botnets (networks of computing devices, infected by malware, used to attack other machines and/or networks). In some instances, the botnets may include one or more cybersecurity threats (e.g., viruses, and/or other cybersecurity threats) that use polymorphic code to repeatedly mutate aspects of the cybersecurity threat to evade detection and/or circumvent security measures. Accordingly, it may be important to provide improved methods of detecting polymorphic botnets.

SUMMARY

Aspects of the disclosure provide effective, efficient, scalable, and convenient technical solutions that address and overcome the technical problems associated with detecting polymorphic botnets. In accordance with one or more arrangements of the disclosure, a computing platform with at least one processor, a communication interface, and memory storing computer-readable instructions may train a pattern matching engine to generate image pattern statuses based on a training set of historical image patterns stored in at least one pattern storage repository. The training set may include a plurality of historical malicious image patterns and a plurality of historical safe image patterns. A given historical image pattern may include historical interaction information for a cloud-based network. The computing platform may automatically generate real-time interaction information based on monitoring interactions between a first user device and a cloud platform. The computing platform may generate a first potentially malicious image pattern based on the real-time interaction information. The computing platform may input the first potentially malicious image pattern into the pattern matching engine to generate an image pattern status for the first potentially malicious image pattern. The pattern matching engine may generate the image pattern status by comparing the first potentially malicious image pattern to at least one historical image pattern. The computing platform may identify that the first potentially malicious image pattern is malicious based on the comparing. In response to identifying that the first potentially malicious image pattern is malicious, the computing platform may store the first potentially malicious image pattern at a malicious pattern storage repository and initiate at least one security action responsive to malicious image patterns. The computing platform may update the pattern matching engine using the first potentially malicious image pattern and the image pattern status for the first potentially malicious image pattern. Updating the pattern matching engine may cause the pattern matching engine to determine one or more additional image pattern statuses based on the image pattern status for the first potentially malicious image pattern.

In one or more examples, the computing platform may retrieve at least one signature of a known botnet from a cybersecurity platform. The computing platform may input the at least one signature into a pattern creation engine to generate at least one known malicious image pattern. The computing platform may store the at least one known malicious image pattern at the at least one pattern storage repository.

In one or more instances, the computing platform may generate a second potentially malicious image pattern based on the real-time interaction information. The computing platform may determine an image pattern status for the second potentially malicious image pattern based on inputting the second potentially malicious image pattern into the pattern matching engine. The computing platform may store the second potentially malicious image pattern at a safe pattern storage repository based on a determination that the second potentially malicious image pattern is a safe image pattern. The computing platform may update the pattern matching engine. Updating the pattern matching engine may cause the pattern matching engine to determine the one or more additional image pattern statuses based on the image pattern status for the second potentially malicious image pattern.

In one or more examples, the computing platform may monitor interactions between the first user device and the cloud platform by receiving interaction information from a custom agent. The custom agent may have previously been installed by the computing platform on a virtual resource of the cloud platform. In one or more instances, the real-time interaction information may include at least one of: network traffic packet information, network flow information, network authentication information, or processing parameters of the first user device. In one or more examples, the computing platform may generate the first potentially malicious image pattern by using a consolidation unit. The consolidation unit may be configured to consolidate interaction information corresponding to the first user device and interaction information corresponding to the cloud platform into an image pattern. The image pattern may include at least one of: a heat map based on a portion of the real-time interaction information, a graphical representation of the portion of the real-time interaction information, and/or a vector representation of the portion of the real-time interaction information.

In one or more instances, the computing platform may initiate the at least one security action by generating a security alert comprising a signature of a known botnet corresponding to at least one historical malicious image pattern of the plurality of historical malicious image patterns. In initiating the security action, the computing platform may further output the security alert. Outputting the security alert may include at least one of: sending a security report comprising the security alert to a cybersecurity platform, and/or causing the first user device to display the security alert.

In one or more examples, the computing platform may initiate the security action by segmenting the first user device from the cloud platform and applying one or more cybersecurity rules to the first user device. The computing platform may determine whether malicious software associated with the first potentially malicious image pattern has been neutralized based on applying one or more cybersecurity rules. The computing platform may reintroduce the first user device to the cloud platform based on a determination that the malicious software has been neutralized. In one or more instances, the real-time interaction information may further be generated based on monitoring interactions between a plurality of additional user devices and the cloud platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
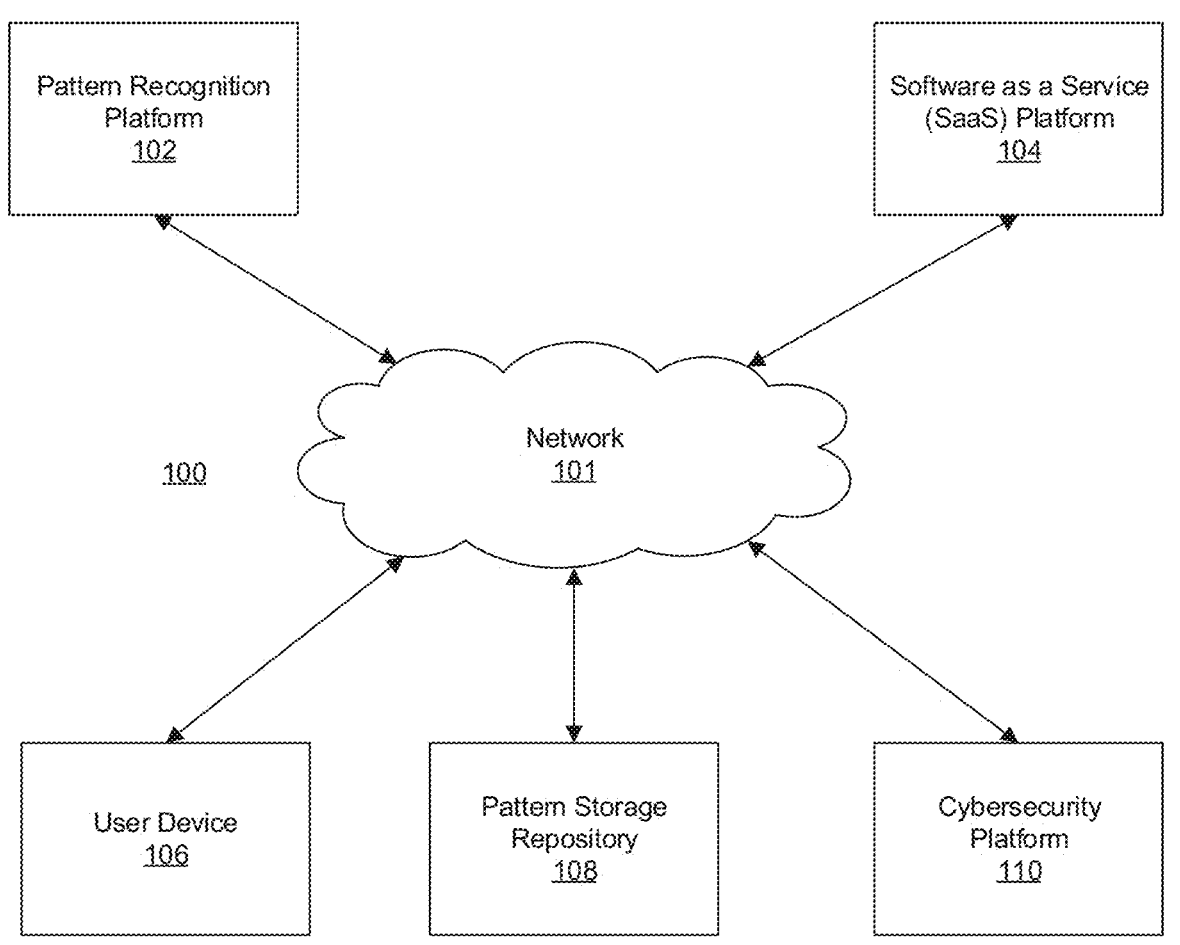
FIGS. 1A-1B depict an illustrative computing environment for detecting polymorphic botnets using an image recognition platform in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for detecting polymorphic botnets using an image recognition platform. Service providers (e.g., an enterprise organization, such as a financial institution and/or other institutions) may implement a cloud-based network providing software services to users (e.g., customers of the enterprise organization, employees of the enterprise organization, and/or other users). This cloud-based network may include a plurality of cloud-based platforms storing virtual cloud resources accessible by the users via one or more user devices (e.g., mobile phones, personal computers, laptops, tablets, or the like). The cloud-based platform may implement one or more conventional security measures to protect the network by detecting threats (e.g., botnets, and/or other cybersecurity threats). Overall, this system of implementing and protecting a cloud-based network is ripe for improvement, because attackers constantly find new ways to evade detection (e.g., by using techniques such as polymorphic botnets). There exists a strong need to provide reliable systems and arrangements for detecting botnets in order to improve security of cloud-based networks. Such systems and arrangements may include a system that uses image patterns (e.g., heat maps, graphs, vectors, or the like) representing real-time interaction information of the network to detect potential botnet attacks, based on known information associated with botnets and/or other cybersecurity threats. However, detecting such botnet attacks may be difficult because botnets may implement polymorphic code that continuously mutates one or more aspects of the botnets (e.g., virus types, encryption/decryption methods, digital signatures, and/or other aspects of the botnets). Accordingly, a system may use a pattern matching engine trained on historical image patterns to identify whether a current, potentially malicious image pattern is malicious or safe. The system may also implement a pattern storage repository (e.g., a database, or the like) to store known image patterns and results of the pattern matching engine for use in further training the pattern matching engine.

Service providers may employ the system described above by retrieving or receiving (e.g., from a cybersecurity service, or the like) signatures of known botnets (e.g., identifying information of one or more networks or devices known to be infected, information indicating the effects of a particular botnet on a cloud based network, network traffic patterns corresponding to known botnets, and/or other signatures). In some instances, these signatures may be fed into a pattern creation engine configured to generate image patterns. In these instances, the system may store the generated image patterns as known malicious image patterns to the pattern storage repository, along with one or more known "safe" image patterns (e.g., image patterns generated based on real-time interaction information during normal operation of the system). These known image patterns may be used to train the pattern matching engine in order to detect botnets based on comparing potentially malicious image patterns to the known image patterns. In doing so, the system may detect real-time botnet attacks based on similarities between the potentially malicious image pattern and one or more known image patterns.

For example, the system may monitor interactions between the user devices and/or applications communicating with one or more cloud platforms on the cloud network to generate real-time interaction information. In these instances, the real-time interaction information may be used to generate a potentially malicious image pattern (e.g., by using the pattern creation engine, and/or by other methods) representative of the real-time information, and use said image pattern as input to the pattern matching engine. Based on inputting the potentially malicious image pattern into the pattern matching engine the system may determine a status (e.g., malicious, safe, and/or other statuses) for the potentially malicious image pattern. In these examples, based on a status indicating the potentially malicious image pattern is malicious, the system may initiate one or more security actions (e.g., microsegmentation or segmentation actions, output of an indicator of a botnet attack, and/or other security actions). In some instances, the system may further update the pattern matching engine based on the potentially malicious image pattern after determining its status.

Figure 1B:
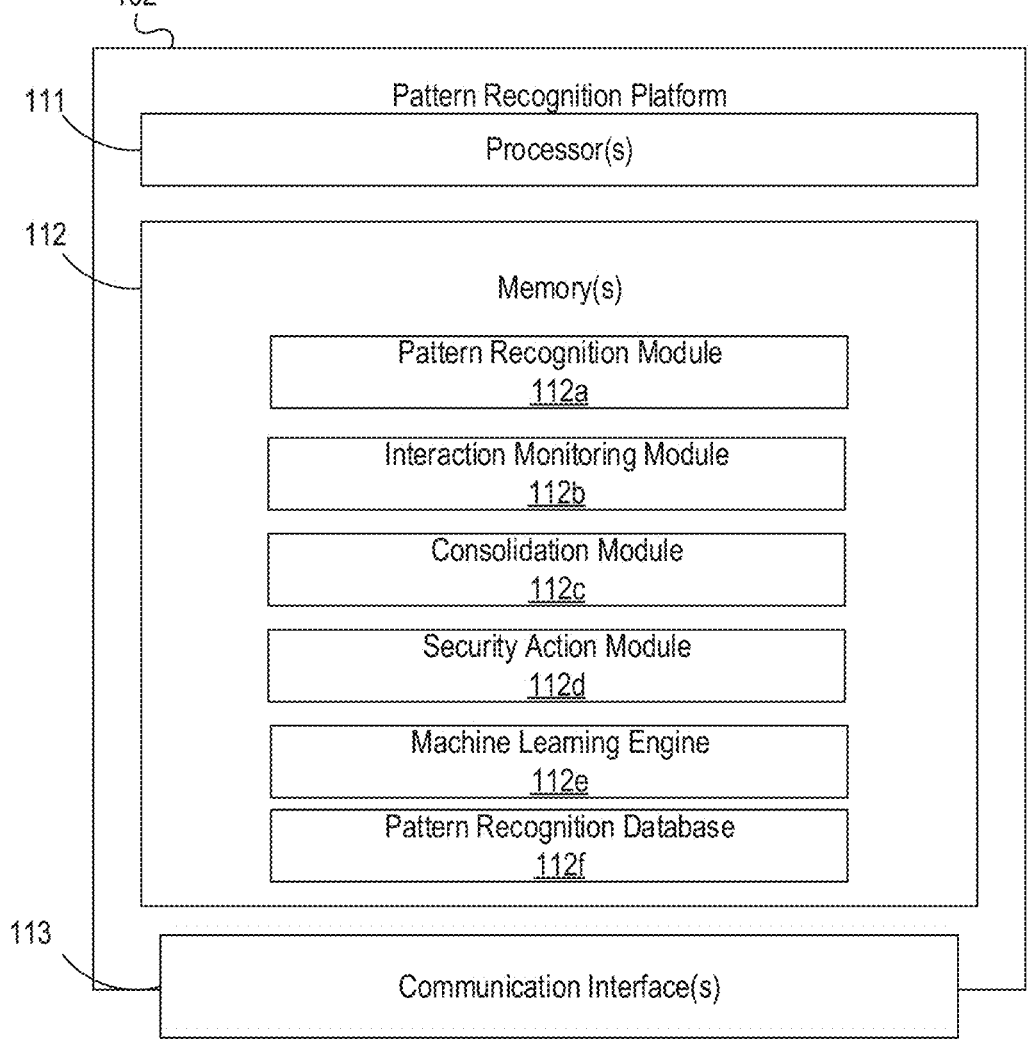

FIGS. 1A-1B depict an illustrative computing environment for detecting polymorphic botnets using an image recognition platform in accordance with one or more example arrangements. Referring to FIG. 1A, computing environment 100 may include one or more computer systems. For example, computing environment 100 may include a pattern recognition platform 102, a Software as a Service (SaaS) platform 104, a user device 106, a pattern storage repository 108, and a cybersecurity platform 110.

As described further below, pattern recognition platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train and/or execute one or more machine learning models (e.g., a pattern matching engine). For example, the pattern recognition platform 102 may train the one or more machine learning models to image pattern statuses based on comparing potentially malicious image patterns with historical image patterns. In some examples, the pattern recognition platform 102 may be further configured to monitor interactions between one or more additional computing devices (e.g., SaaS platform 104, user device 106, and/or other computing devices). In some instances, pattern recognition platform 102 may be controlled or otherwise maintained by an enterprise organization (e.g., a financial institution, and/or other institutions). In one or more examples, the pattern recognition platform 102 may be configured to communicate with one or more systems (e.g., SaaS platform 104, user device 106, pattern storage repository 108, cybersecurity platform 110, and/or other systems) to perform an information transfer, display an interface, initiate a security action, and/or perform other functions.

SaaS platform 104 may be a computer system that includes one or more computing devices (e.g., servers, laptop computer, desktop computer, mobile device, tablet, smartphone, and/or other devices) and/or other computer components (e.g., processors, memories, communication interfaces, databases) that may be used to provide cloud-based services (e.g., storage services, applications, offer cloud computing components, and/or other services). For example, SaaS platform 104 may include one or more computing devices that store and/or host one or more virtual cloud resources (e.g., applications, documents, files, and/or other resources) accessible by affiliated entities (e.g., subscribers, customers, and/or other entities) of a cloud service provider. In some instances, the SaaS platform 104 may be operated by such a cloud service provider (e.g., an enterprise organization, such as an information technology institution, and/or other institutions) providing cloud-based software-as-a-service to one or more affiliated entities. In one or more examples, SaaS platform 104 may be configured to communicate with one or more systems (e.g., pattern recognition platform 102, user device 106, and/or other systems) to perform an information transfer, initiate security actions, store virtual cloud resources, and/or other functions.

User device 106 may be a computing device (e.g., laptop computer, desktop computer, mobile device, tablet, smartphone, server, server blade, and/or other device) and/or other information storing or computing component (e.g., processors, memories, communication interfaces, databases) that may be used to transfer information between users and/or perform other user functions (e.g., requesting user input, providing a proposed password, and/or other functions). In one or more instances, user device 106 may correspond to a first user (who may, e.g., be an employee or client of the enterprise organization, such as a financial institution and/or other institution). In one or more instances, the user device 106 may be configured to communicate with one or more systems (e.g., pattern recognition platform 102, SaaS platform 104, and/or other systems) to perform an information transfer, send and receive digital communications, access virtual cloud resources, and/or to perform other functions. In some instances, the user device 106 may be configured to display one or more graphical user interfaces (e.g., botnet alert interfaces, and/or other interfaces). Although shown as a single user device, it should be understood that, in some instances, one or more additional user devices similar to user device 106 may be included in computing environment 100.

Pattern storage repository 108 may be and/or otherwise include one or more computing devices (e.g., servers, server blades, and/or other devices) and/or other computer components (e.g., processors, memories, communication interfaces) that may be used to create, host, modify, and/or otherwise validate an organized collection of information (e.g., a database). The pattern storage repository 108 may be synchronized across multiple nodes (e.g., sites, institutions, geographical locations, and/or other nodes) and may be accessible by multiple users (who may, e.g., be employees or clients of an enterprise organization such as a financial institution). The information stored at the pattern storage repository 108 may include any of the information (e.g., historical image patterns, real-time interaction information, and/or other information) stored at and/or created by pattern recognition platform 102, and/or any additional information. In some instances, the pattern storage repository 108 may be accessed by, validated by, and/or modified by any of, pattern recognition platform 102, user device 106, and/or other devices. In some instances, the pattern storage repository 108 may be and/or include one or more separate repositories (e.g., a malicious image pattern storage repository, a safe image pattern storage repository, and/or other repositories). Although shown as an independent database, in some instances, the pattern storage repository 108 may be part of and/or otherwise integrated into the pattern recognition platform 102 without departing from the scope of the disclosure.

Cybersecurity platform 110 may be a computer system that includes one or more computing devices (e.g., servers, laptop computer, desktop computer, mobile device, tablet, smartphone, and/or other devices) and/or other computer components (e.g., processors, memories, communication interfaces, databases) that may be connected to and/or integrated in a cybersecurity-as-a-service (CSaaS) network. Cybersecurity platform 110 may be operated by a CSaaS provider (e.g., an enterprise organization, such as a cyber-security institution, and/or other institutions) providing cybersecurity services to affiliated entities (e.g., customers, subscribers, and/or other affiliated entities). The CSaaS provider may operate to protect its affiliated entities from one or more (e.g., particular or various) cyber threats and/or attacks, such as botnet attacks. Cybersecurity platform 110 may be configured to perform multiple functions and/or services for protecting affiliated entities from one or more cyber threats and/or attacks. For example, cybersecurity platform 110 may maintain a record of known cyber threats and corresponding cyber threat information (e.g., botnet signatures (such as identifying information of one or more networks or devices known to be infected, information indicating the effects of a particular botnet on a cloud based network, network traffic patterns corresponding to known botnets, and/or other signatures), image patterns, and/or other information). In one or more examples, cybersecurity platform 110 may be configured to communicate with one or more systems (e.g., pattern recognition platform 102, and/or other systems) to perform an information transfer and/or other functions.

Computing environment 100 also may include one or more networks, which may interconnect pattern recognition platform 102, SaaS platform 104, user device 106, pattern storage repository 108, and cybersecurity platform 110. For example, computing environment 100 may include a network 101 (which may interconnect, e.g., pattern recognition platform 102, SaaS platform 104, user device 106, pattern storage repository 108, and cybersecurity platform 110). In some instances, the network 101 may include interaction information (e.g., information corresponding to authentication attempts, information transfers, storage requests, and/or other information) between one or more devices connected via the network 101.

In one or more arrangements, pattern recognition platform 102, SaaS platform 104, user device 106, pattern storage repository 108, and cybersecurity platform 110 may be any type of computing device capable of sending and/or receiving requests and processing the requests accordingly. For example, pattern recognition platform 102, SaaS platform 104, user device 106, pattern storage repository 108, cybersecurity platform 110, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of pattern recognition platform 102, SaaS platform 104, user device 106, pattern storage repository 108, and cybersecurity platform 110, may, in some instances, be special-purpose computing devices configured to perform specific functions.

Referring to FIG. 1B, pattern recognition platform 102 may include one or more processors 111, memory 112, and communication interface 113. An information bus may interconnect processor 111, memory 112, and communication interface 113. Communication interface 113 may be a network interface configured to support communication between pattern recognition platform 102 and one or more networks (e.g., network 101, or the like).

Communication interface 113 may be communicatively coupled to the processor 111. Memory 112 may include one or more program modules having instructions that, when executed by processor 111, cause pattern recognition platform 102 to perform one or more functions described herein and/or one or more databases (e.g., a pattern recognition database 112f, pattern storage repository 108, or the like) that may store and/or otherwise maintain information which may be used by such program modules and/or processor 111. In some instances, the one or more program modules and/or databases may be stored by and/or maintained in different memory units of pattern recognition platform 102 and/or by different computing devices that may form and/or otherwise make up pattern recognition platform 102. For example, memory 112 may have, host, store, and/or include pattern recognition module 112a, interaction monitoring module 112b, consolidation module 112c, security action module 112d, machine learning engine 112e, and/or pattern recognition database 112f.

Pattern recognition module 112a may have instructions that direct and/or cause pattern recognition platform 102 to generate image patterns based on botnet signatures, generate image pattern statuses using the pattern matching engine, and/or perform other pattern recognition functions. Interaction monitoring module 112b may have instructions that direct and/or cause pattern recognition platform 102 to monitor interactions between user devices (e.g., user device 106, or the like) and cloud-based platform(s) (e.g., one or more devices and/or platforms of SaaS platform 104, or the like) to generate real-time interaction information. Consolidation module 112c may have instructions that direct and/or cause pattern recognition platform 102 to consolidate one or more streams of real-time interaction information into a set of real-time interaction information to input into the pattern matching engine (that may, e.g., be used to detect polymorphic botnets). Security action module 112d may have instructions that direct and/or cause pattern recognition platform 102 to initiate one or more security actions (e.g., as a result of detecting polymorphic botnets). Machine learning engine 112e may contain instructions causing pattern recognition platform 102 to train, implement, and/or update a machine learning model, such as pattern matching engine, (that may, e.g., be used to detect polymorphic botnets using the pattern matching engine). In some instances, machine learning engine 112e may be used by pattern recognition platform 102 and/or pattern recognition module 112a to refine and/or otherwise update methods for detecting polymorphic botnets using a pattern matching platform, and/or other methods described herein. Pattern recognition database 112f may have instructions causing pattern recognition platform 102 to store image patterns and/or real-time interaction information (that may, e.g., be used to generate image pattern statuses and/or detect polymorphic botnets using the pattern matching engine).

Figure 2A:
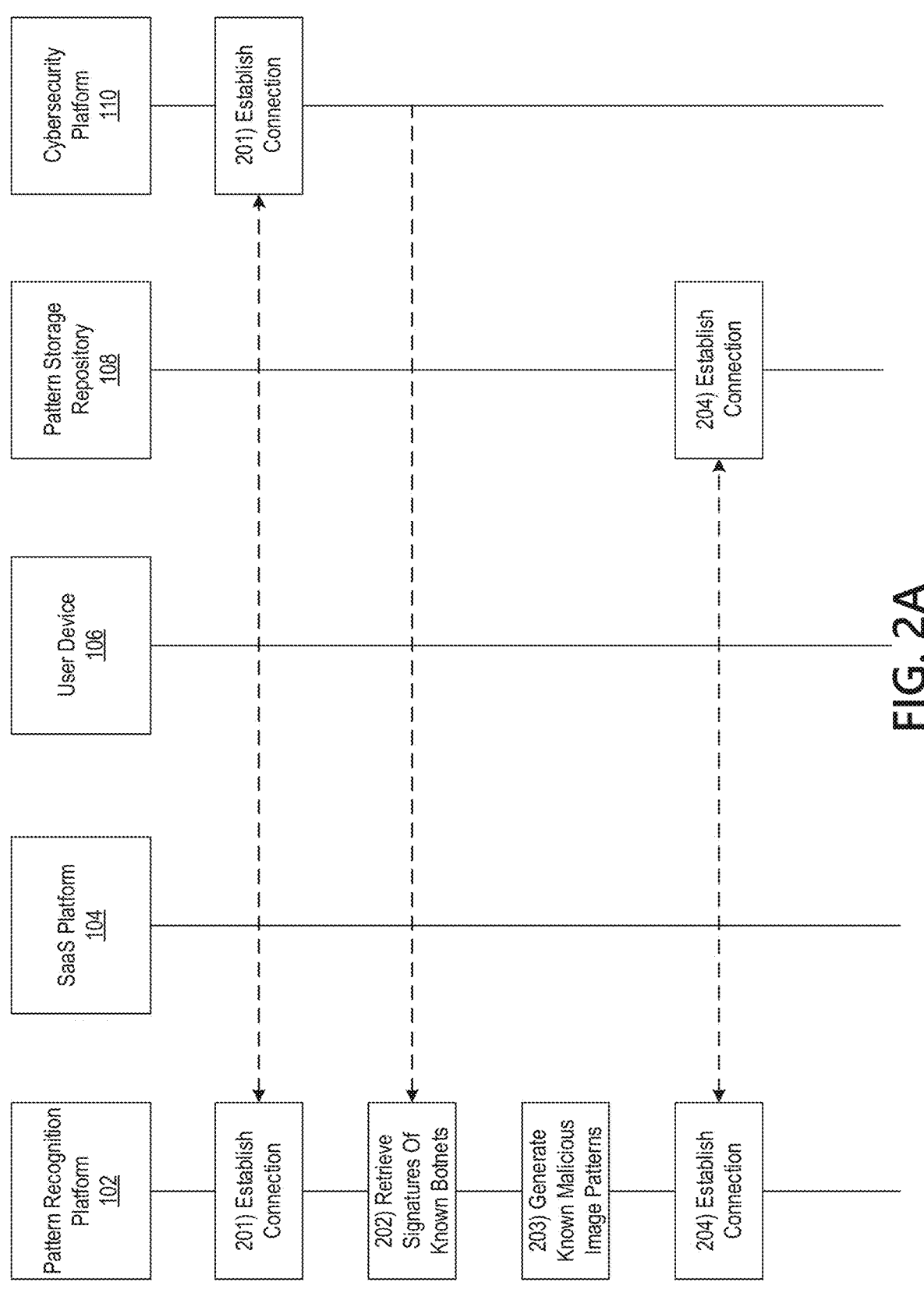
FIGS. 2A-2D depict an illustrative event sequence for detecting polymorphic botnets using an image recognition platform in accordance with one or more example arrangements.

FIGS. 2A-2D depict an illustrative event sequence for detecting polymorphic botnets using an image recognition platform in accordance with one or more example arrangements. Referring to FIG. 2A, at step 201, the pattern recognition platform 102 may establish a connection with cybersecurity platform 110. For example, pattern recognition platform 102 may establish a first wireless data connection with the cybersecurity platform 110 to link the cybersecurity platform 110 with the pattern recognition platform 102 (e.g., in preparation for transferring botnet signatures, and/or other functions). In some instances, the pattern recognition platform 102 may identify whether or not a connection is already established with the cybersecurity platform 110. If a connection is already established with the cybersecurity platform 110, the pattern recognition platform 102 might not re-establish the connection. If a connection is not yet established with the cybersecurity platform 110, the pattern recognition platform 102 may establish the first wireless data connection as described above.

At step 202, the pattern recognition platform 102 may retrieve one or more botnet signatures from the cybersecurity platform 110. For example, in some instances, the cybersecurity platform 110 may maintain a record of botnet signatures (e.g., identifying information of one or more networks or devices known to be infected, information indicating the effects of a particular botnet on a cloud based network, network traffic patterns corresponding to known botnets, and/or other signatures) gathered from various sources (e.g., other affiliated entities, cybersecurity threat reports, and/or other sources) in order to provide cybersecurity services. In these examples, the pattern recognition platform 102 may request and/or otherwise retrieve the one or more botnet signatures maintained by cybersecurity platform 110. For example, the pattern recognition platform 102 may retrieve the one or more botnet signatures via the communication interface 113 and while the first wireless data connection is established. In doing so, the pattern recognition platform 102 may, in some instances, store the retrieved botnet signatures to memory (e.g., internal memory of the pattern recognition platform 102, and/or other memory).

At step 203, based on retrieving the one or more botnet signatures from cybersecurity platform 110, the pattern recognition platform 102 may generate one or more known malicious image patterns. In some examples, the pattern recognition platform 102 may generate the one or more known malicious image patterns using a pattern creation engine (which may, e.g., be maintained by memory 112, and/or other internal memory) by inputting the one or more botnet signatures into the pattern creation engine. In generating the one or more known malicious image patterns, the pattern creation engine may analyze the botnet signatures in order to generate heat maps, vectors, graphs, and/or other representations indicating that a botnet attack occurred based on a given botnet signature. In some examples, the pattern creation engine may identify spikes in central processing unit (CPU) usage from a botnet signature corresponding to a known botnet attack. Accordingly, the pattern creation engine may generate a heat map of CPU usage as the image pattern. Additionally or alternatively, the pattern creation engine may identify one or more of netflow reports, packet/network traffic information, processing parameters, and/or other factors indicative of botnet attacks in order to generate the known malicious image patterns. In some instances, the known malicious image patterns may each comprise multiple heat maps, vectors, graphs, and/or other representations indicative of a botnet attack.

At step 204, the pattern recognition platform 102 may establish a connection with pattern storage repository 108. For example, pattern recognition platform 102 may establish a second wireless data connection with the pattern storage repository 108 to link the pattern storage repository 108 with the pattern recognition platform 102 (e.g., in preparation for storing image patterns, retrieving training sets of historical image patterns, and/or other functions). In some instances, the pattern recognition platform 102 may identify whether or not a connection is already established with the pattern storage repository 108. If a connection is already established with the pattern storage repository 108, the pattern recognition platform 102 might not re-establish the connection. If a connection is not yet established with the pattern storage repository 108, the pattern recognition platform 102 may establish the second wireless data connection as described above.

Figure 2B:
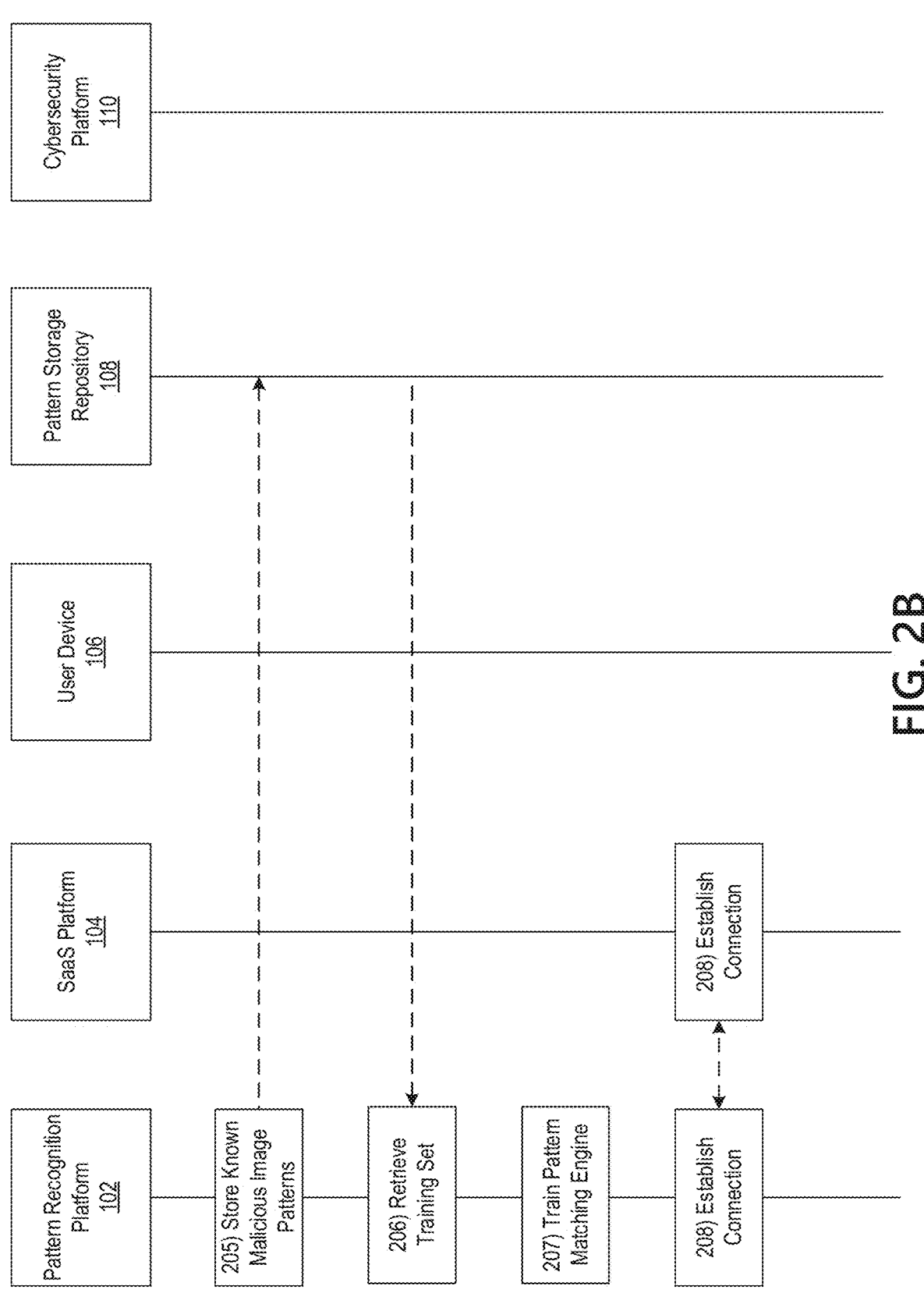

Referring to FIG. 2B, at step 205, the pattern recognition platform 102 may store one or more known malicious image patterns (e.g., the known malicious image patterns generated at step 203) to the pattern storage repository 108. For example, the pattern recognition platform 102 may store the known image patterns to internal memory of pattern storage repository 108, and/or external memory. In some instances, the pattern storage repository 108 may be a component of pattern recognition platform 102. In these instances, in storing the known image patterns, the pattern recognition platform 102 may store the known malicious image patterns to internal memory of the pattern recognition platform 102 (e.g., memory 112, and/or other memory). In some examples, the pattern storage repository 108 may include one or more historical image patterns. For example, the pattern storage repository 108 may include historical safe image patterns, which may, e.g., represent network conditions in situations known to be free of botnet attacks, and/or historical malicious image patterns, which may, e.g., represent network conditions in situations where a network was attacked by a botnet (and which may, e.g., have previously been generated by pattern recognition platform 102 using the pattern creation engine). In these examples, the pattern recognition platform 102 may store the one or more known malicious image patterns as part of a repository of historical malicious image patterns. The one or more historical image patterns may be and/or include historical interaction information for a cloud-based network (e.g., a cloud-based network hosting SaaS platform 104, and/or other cloud-based networks).

At step 206, the pattern recognition platform 102 may retrieve a training set from the pattern storage repository 108

(e.g., in order to train a pattern matching engine). In some examples, the training set may be a training set of historical image patterns stored at pattern storage repository 108, which may be and/or include one or more historical safe image patterns and/or one or more historical malicious image patterns (which may, e.g., include one or more of the known malicious image patterns generated by the pattern recognition platform 102 at step 203). In some instances, the pattern recognition platform 102 may retrieve the training by accessing memory of the pattern storage repository 108 (e.g., internal memory, and/or other memory). In some examples, the pattern storage repository 108 may be a component of pattern recognition platform 102, and pattern recognition platform 102 may retrieve the training set by accessing internal memory (e.g., memory 112, and/or other internal memory) and/or external memory. Additionally or alternatively, the pattern recognition platform 102 may retrieve the training set by sending a request for the training set to pattern storage repository 108 and receiving the training set in response (e.g., via the communication interface 113 and while the second wireless data connection is established.

At step 207, the pattern recognition platform 102 may train a pattern matching engine to output image pattern statuses for potentially malicious image patterns. In some instances, the pattern recognition platform 102 may configure and/or otherwise train the pattern matching engine based on a training set of historical image patterns (e.g., the training set retrieved from pattern storage repository 108, as described above at step 206). In some instances, to configure and/or otherwise train the pattern matching engine, the pattern recognition platform 102 may process the training set of historical image patterns by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the pattern recognition platform 102 may train the pattern matching engine to output image pattern statuses for potentially malicious image patterns.

For example, in configuring and/or otherwise training the pattern matching engine, the pattern recognition platform 102 may identify interaction information (e.g. network traffic packet information, network flow information, network authentication information, processing parameters (such as CPU usage, memory usage, and/or other parameters) of a user device interacting with a cloud-based network, and/or other interaction information) associated with each historical image pattern in the training set of historical image patterns. For instance, the pattern recognition platform 102 may, for a given set of historical image patterns, identify that a particular processing parameter corresponds to a plurality of a particular type of historical image pattern. For example, the pattern recognition platform 102 may identify that CPU usage exceeding seventy percent of the maximum processing capabilities of a user device communicating with a cloud-based platform (e.g., SaaS platform 104, and/or other cloud-based platforms) is associated with a majority of historical malicious image patterns in the set of historical image patterns. Accordingly, the pattern recognition platform 102 may train the pattern matching engine to generate an image pattern status indicating a potentially malicious image pattern is malicious based on interaction information corresponding to the potentially malicious image pattern indicating CPU usage exceeding seventy percent of the maximum processing capabilities of a user device. Additionally or alternatively, in some examples, the pattern recognition platform 102 may identify that CPU usage at or below seventy percent of the maximum processing capabilities of a user device is associated with a majority of historical safe image patterns in the set of historical image patterns. Accordingly, the pattern recognition platform 102 may train the pattern matching engine to generate an image pattern status indicating a potentially malicious image pattern is safe based on interaction information corresponding to the potentially malicious image pattern indicating CPU usage at or below seventy percent of the maximum processing capabilities of a user device.

Additionally or alternatively, in configuring and/or otherwise training the pattern matching engine the pattern recognition platform 102 may input the training set of historical image patterns into the pattern matching engine. Based on inputting the training set of historical image patterns into the pattern matching engine, the pattern recognition platform 102 may identify interaction information such as network information corresponding to a particular type of historical image pattern (e.g., to historical safe image patterns, and/or to historical malicious image patterns). For example, the pattern recognition platform 102 may mine the training set of historical image patterns to identify that network authentication information, indicating that a threshold number of failed authentication attempts was exceeded, corresponds to historical malicious image patterns. The pattern recognition platform 102 may then configure and/or otherwise train the pattern matching engine to generate an image pattern status indicating a potentially malicious image pattern is malicious based on interaction information indicating a threshold number of failed authentication attempts was exceeded. For example, the pattern recognition platform 102 may store a correlation between interaction information indicating the threshold number of failed authentication attempts was exceeded and historical malicious image patterns. It should be noted that the above are merely a few exemplary methods by which the pattern recognition platform 102 may additionally and/or alternatively configure and/or otherwise train the pattern matching engine based on additional interaction information (e.g., network flow information, network traffic packet information, and/or other interaction information) and/or other information of the training set of historical image patterns.

At step 208, the pattern recognition platform 102 may establish a connection with SaaS platform 104. For example, pattern recognition platform 102 may establish a third wireless data connection with the SaaS platform 104 to link the SaaS platform 104 with the pattern recognition platform 102 (e.g., in preparation for monitoring interactions between user devices, such as user device 106 and/or other user devices, and SaaS platform 104, generating real-time interaction information, and/or other functions). In some instances, the pattern recognition platform 102 may identify whether or not a connection is already established with the SaaS platform 104. If a connection is already established with the SaaS platform 104, the pattern recognition platform 102 might not re-establish the connection. If a connection is not yet established with the SaaS platform 104, the pattern recognition platform 102 may establish the third wireless data connection as described above.

Figure 2C:
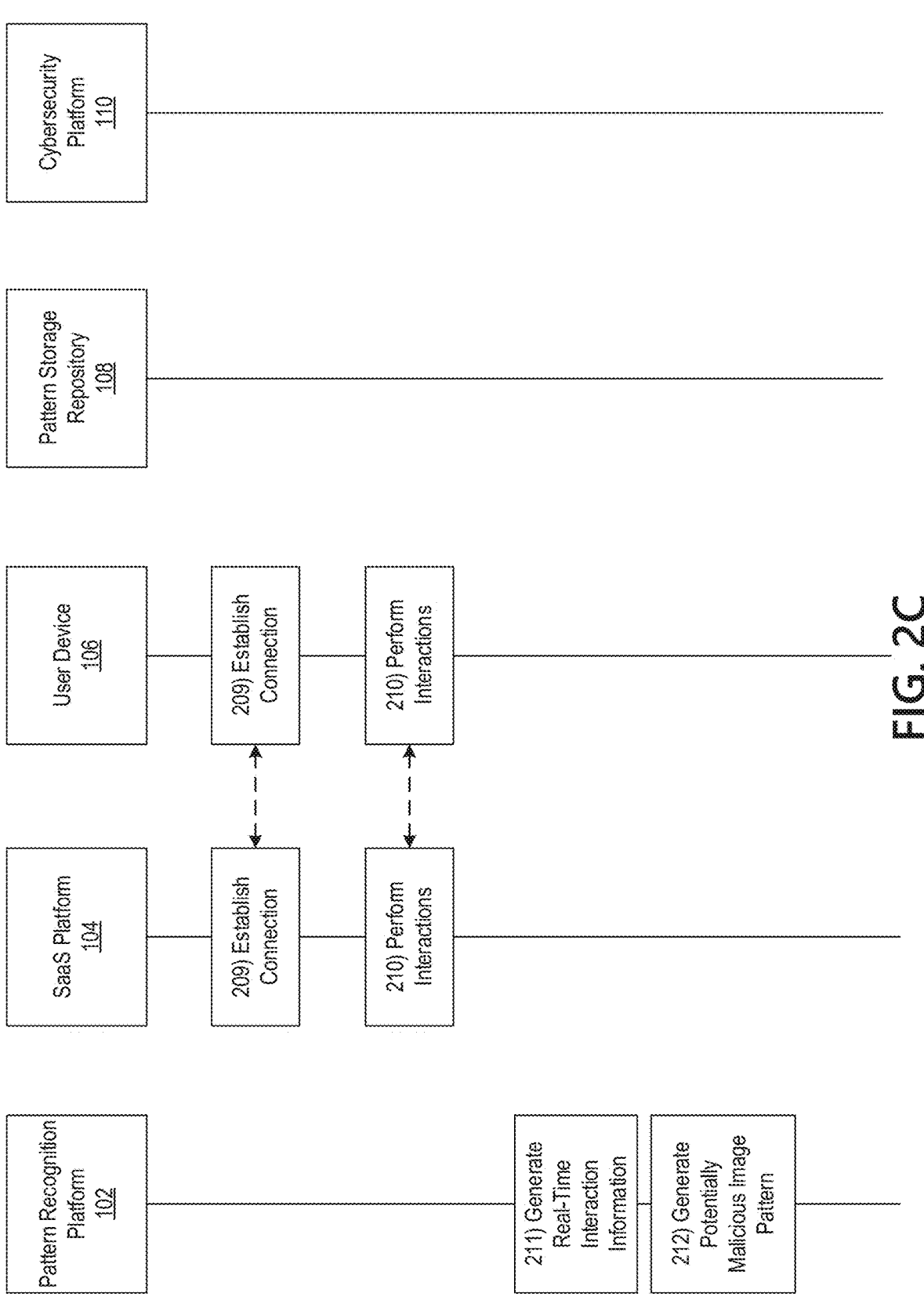

Referring to FIG. 2C, at step 209, the user device 106 may establish a connection with SaaS platform 104. For example, user device 106 may establish a fourth wireless data connection with the SaaS platform 104 to link the SaaS platform 104 with the user device 106 (e.g., in preparation for performing interactions (such as performing an information transfer, sending and/or receiving digital communications, accessing virtual cloud resources and/or other interactions), and/or other functions). In some instances, the user device 106 may identify whether or not a connection is already established with the SaaS platform 104. If a connection is already established with the SaaS platform 104, the user device 106 might not re-establish the connection. If a connection is not yet established with the SaaS platform 104, the user device 106 may establish the fourth wireless data connection as described above.

At step 210, the user device 106 may perform interactions with the SaaS platform 104. For example, the user device 106 may perform an information transfer, send and receive digital communications, access virtual cloud resources, and/or perform other interactions. In performing the interactions, the user device 106 may cause network traffic to flow between the SaaS platform 104 and user device 106 (e.g., by sending and/or receiving data packets, and/or by other methods). For example, the user device 106 may communicate (e.g., via a communication interface similar to communication interface 113) with one or more computing devices hosted by and/or included in SaaS platform 104 (which may, e.g., host and/or include a plurality of cloud-based computing devices configured to provide cloud computing functions, e.g. as part of a software-as-a-service enterprise). In some instances, the user device 106 may perform interactions with the SaaS platform 104 via a custom agent installed on a virtual cloud resource accessed by user device 106. For example, an enterprise organization (e.g., an enterprise organization associated with pattern recognition platform 102, such as a financial institution and/or other institutions), and/or other organizations, may have previously caused the custom agent to be installed on a virtual cloud resource stored at SaaS platform 104 (e.g., via the pattern recognition platform 102 and while the third wireless data connection is established) in order to allow the pattern recognition platform 102 to monitor access of the virtual cloud resource. In these instances, the custom agent may further be configured to send information related to the interactions between SaaS platform 104 and user device 106 to the pattern recognition platform 102 (e.g., in order to perform detection of polymorphic botnets using a pattern matching engine). It should be understood that while step 210 describes a single user device 106 performing interactions with the SaaS platform 104, a plurality of additional user devices may be performing interactions with the SaaS platform 104, in the manner described above and at the same time.

At step 211, based on the user device 106 performing interactions with the SaaS platform 104, the pattern recognition platform 102 may generate real-time interaction information which may, e.g., correspond to the interactions. For example, the pattern recognition platform 102 may generate real-time interaction information in the form of a record of multiple observable factors (e.g., network traffic packet information, network flow information, network authentication information, processing parameters (such as CPU usage, memory usage, and/or other parameters) of a user device interacting with a cloud-based network, and/or other interaction information). In some examples, the pattern recognition platform 102 may generate the real-time interaction information by monitoring the interactions between the SaaS platform 104 and user device 106. For example, in generating the real-time interaction information, the pattern recognition platform 102 may monitor network traffic between the SaaS platform 104 and user device 106 (e.g., while the fourth wireless data connection is established) and maintain a record of the network traffic based on receiving authorization from the user of user device 106 (e.g., an employee of the enterprise organization associated with pattern recognition platform 102, a customer of the enterprise organization associated with pattern recognition platform 102, and/or other users) to monitor interactions between the pattern recognition platform 102 and the SaaS platform 104 in order to protect the user device 106 and/or the SaaS platform 104 from cybersecurity threats (e.g., polymorphic botnet attacks, and/or other threats). Additionally or alternatively, in some instances, the pattern recognition platform 102 may generate the real-time interaction information by monitoring the interactions via the custom agent which may be installed on a virtual cloud resource accessed by user device 106. For example, the custom agent may be configured to periodically report interaction information to the pattern recognition platform 102, and the pattern recognition platform 102 may generate the real-time interaction information based on these periodic reports. Additionally or alternatively, in some instances, the custom agent may be configured to provide interaction information to the pattern recognition platform 102 each time a user device (e.g., user device 106, and/or other user devices) accesses the virtual cloud resource. As described above, in some instances a plurality of additional user devices may be performing interactions with the SaaS platform 104 at the same time. In these instances, the pattern recognition platform 102 may generate the real-time interaction information by monitoring interactions between the plurality of additional user devices and the SaaS platform 104, using the methods described above. In some instances, the pattern recognition platform 102 may generate the real-time interaction information automatically (e.g., whenever an interaction, such as user device 106 sending and/or receiving a packet from SaaS platform 104, accessing a virtual cloud resource at SaaS platform 104, and/or by other means, occurs).

At step 212, the pattern recognition platform 102 may generate a potentially malicious image pattern. For example, the pattern recognition platform 102 may generate the potentially malicious image pattern based on the real-time interaction information generated at step 211. In some examples, in generating the potentially malicious image pattern, the pattern recognition platform 102 may consolidate real-time interaction information (e.g., in the one or more records of multiple observable factors (e.g., network traffic packet information, network flow information, network authentication information, processing parameters (such as CPU usage, memory usage, and/or other parameters) of a user device interacting with a cloud-based network, and/or other interaction information). In consolidating real-time interaction information, the pattern recognition platform 102 may implement a consolidation unit. The consolidation unit may be a computer program and/or module configured to consolidate real-time interaction information corresponding to multiple sources (e.g., one or more user devices such as user device 106 and/or other user devices, a cloud platform such as SaaS platform 104 and/or other cloud platforms, and/or other sources) into a potentially malicious image pattern. For example, the consolidation unit may consolidate real-time interaction information corresponding to a user device (e.g., user device 106 and/or other user devices), such as CPU usage and/or other interaction information, with real-time interaction information corresponding to a cloud platform (e.g., SaaS platform 104, and/or other cloud platforms), such as information related to sent/received packets, and/or other interaction information, into a potentially malicious image pattern. In consolidating the real-time interaction information into a potentially malicious image pattern, the consolidation unit may consolidate one or more portions of the real-time interaction information generated at step 211 into one or more heat maps, graphical representations, vector representations, and/or other image patterns. In some instances, the consolidation unit may be and/or include the pattern creation engine.

Figure 2D:
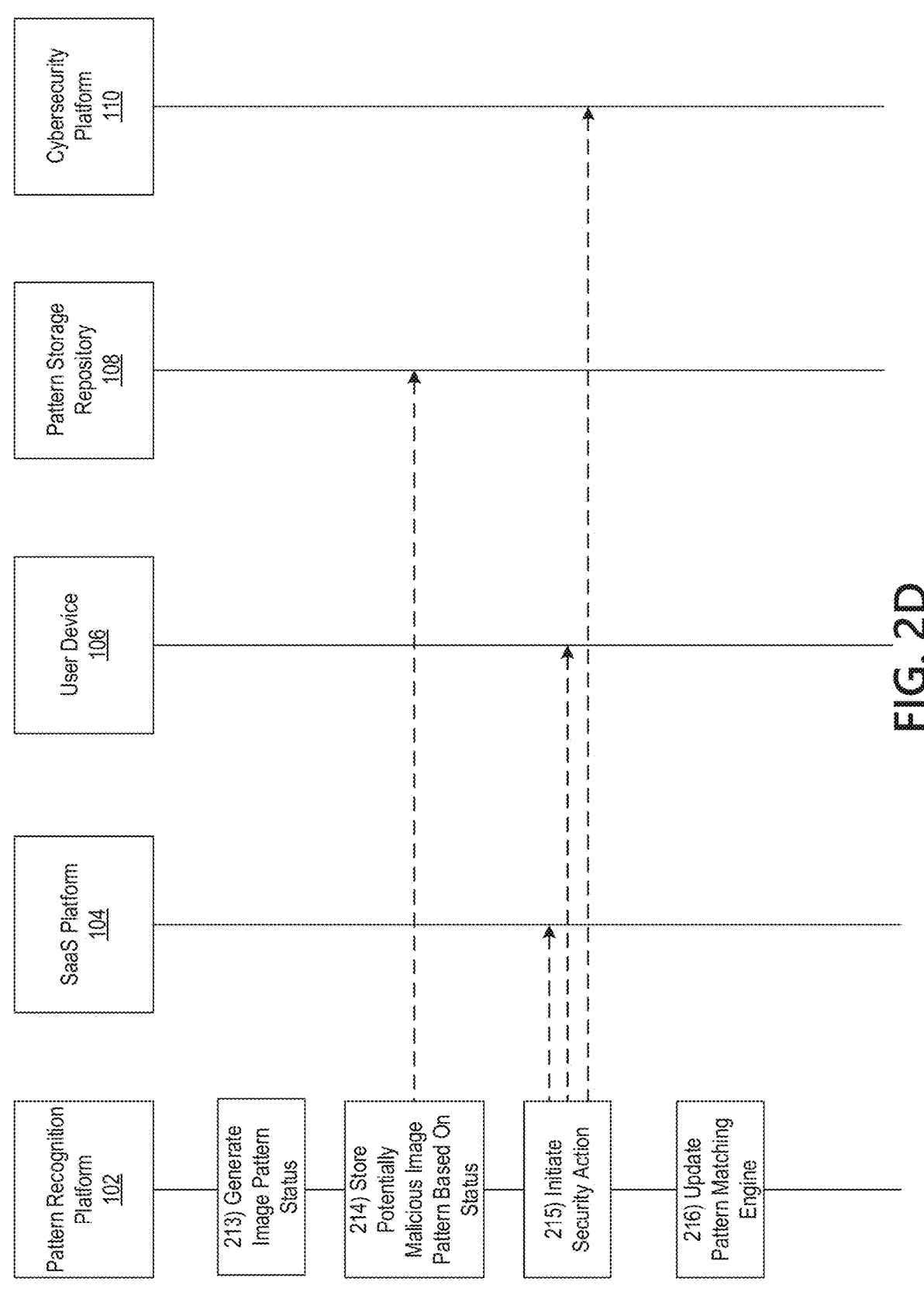

Referring to FIG. 2D, at step 213, the pattern recognition platform 102 may generate an image pattern status for the potentially malicious image pattern. In generating the image pattern status, the pattern recognition platform 102 may input the potentially malicious image pattern into the pattern matching engine. In generating the image pattern status, based on inputting the potentially malicious image pattern into the pattern matching engine, the pattern recognition platform 102 may use some or all of the training set of historical image patterns (e.g., described above at step 206). For example, the pattern recognition platform 102 may cause the pattern matching engine to compare the potentially malicious image pattern to one or more historical safe image patterns and/or one or more historical malicious image patterns. Based on the comparison, the pattern matching engine may generate a similarity score (which may, e.g., be an integer value, a percentage value, a decimal value, and/or any other score capable of being generated by a machine learning model) between the potentially malicious image pattern, the one or more historical safe image patterns and/or the one or more historical malicious image patterns. For instance, the pattern matching engine may compare one or more features of the potentially malicious image pattern and a given historical image pattern (e.g., a vector value, a value represented in a graph, an intensity of a region of a heat map, and/or other features) to generate the similarity score. The pattern matching engine may, in some instances, generate the image pattern status based on comparing the similarity score to a similarity threshold.

For example, the pattern matching engine may compare the potentially malicious image pattern to one historical safe image pattern and one historical malicious image pattern. Based on comparing the potentially malicious image pattern to the historical safe image pattern, the pattern matching engine may identify (e.g., based on a value represented by a graph, and/or by other means) that the CPU usage corresponding to the historical safe image pattern is 40 percent, the CPU usage corresponding to the potentially malicious image pattern is 60 percent, and the difference between the two is 20 percent. Accordingly, in this example, the pattern matching engine may generate a similarity score of 20. Based on comparing the potentially malicious image pattern to the historical malicious image pattern, the pattern matching engine may identify that the CPU usage corresponding to the historical malicious image pattern is 65 percent, the difference between the CPU usages is 5 percent, and accordingly may generate a similarity score of 5. Based on comparing the similarity score between the potentially malicious image pattern and the historical safe image pattern to a similarity threshold satisfied by similarity scores less than 15, the pattern matching engine may identify that the potentially malicious image pattern is not a safe image pattern. Based on comparing the similarity score between the potentially malicious image pattern and the historical malicious image pattern to the same similarity threshold satisfied by similarity scores less than 15, the pattern matching engine may identify that the potentially malicious image pattern is a malicious image pattern. Accordingly, the pattern matching engine may generate an image pattern status identifying the potentially malicious image pattern as a malicious image pattern.

Additionally or alternatively, in some examples, the pattern recognition platform 102 may have previously trained the pattern matching engine to employ a pattern matching algorithm to generate image pattern statuses. For example, the pattern matching engine may execute the pattern matching algorithm using the following constraints/parameters:

---

If (similarity score for historical safe image pattern 1) + (similarity score for historical safe image pattern 2) + . . . (similarity score for historical safe image pattern N) ≤ (similarity score for historical malicious image pattern 1) + (similarity score for historical safe malicious pattern 2) + . . . (similarity score for historical maliciouis image pattern N), then: image pattern status = malicious. If else, then: image pattern status = safe.

---

In this example, if the sum of the similarity scores generated by comparing the potentially malicious image pattern to each of N different historical safe image patterns is less than or equal to the sum of the similarity scores generated by comparing the potentially malicious image pattern to each of N different historical malicious image patterns, then the pattern matching engine may generate an image pattern status identifying the potentially malicious image pattern as malicious. Else, the pattern matching engine may generate an image pattern status identifying the potentially malicious image pattern as safe. Note that the above example is merely one algorithm the pattern matching engine may be trained to employ in order to generate the image pattern status and in one or more instances additional or alternative algorithms may be employed and/or may correspond to different parameters.

It should be understood that while the above description refers to a single potentially malicious image pattern, the pattern recognition platform 102 may perform the steps described above for a plurality of potentially malicious image patterns in additional iterations of the polymorphic botnet detection process described herein.

At step 214, the pattern recognition platform 102 may store the potentially malicious image pattern to the pattern storage repository 108. In some examples, the pattern recognition platform 102 may store the potentially malicious image pattern to internal storage of the pattern storage repository 108 and/or external storage. In some examples, the pattern storage repository 108 may be part of and/or otherwise integrated into the pattern recognition platform 102. In these examples, the pattern recognition platform 102 may store the potentially malicious image pattern to internal memory of the pattern recognition platform 102 (e.g., memory 112, and/or other internal memory). In some instances, the pattern recognition platform 102 may store the potentially malicious image pattern by sending the potentially malicious image pattern to the pattern storage repository 108 (e.g., via the wireless communication interface 113 and while the second wireless data connection is established.) In these instances, in sending the potentially malicious image pattern, the pattern recognition platform 102 may additionally send one or more instructions directing the pattern storage repository 108 to store the potentially malicious image pattern, and/or may send an indicator of the image pattern status (e.g., the image pattern status generated at step 213) corresponding to the potentially malicious image pattern.

In some instances, the pattern recognition platform 102 may store the potentially malicious image pattern based on the image pattern status generated at step 213. For example, the pattern recognition platform 102 may cause the pattern storage repository 108 to store the potentially malicious image pattern as a historical safe image pattern, based on an image pattern status corresponding to the potentially malicious image pattern and identifying the potentially malicious image pattern as a safe image pattern (e.g., at a safe image pattern repository of pattern storage repository 108). Based on an image pattern status corresponding to the potentially malicious image pattern and identifying the potentially malicious image pattern as a malicious image pattern, the pattern recognition platform 102 may cause the pattern storage repository 108 to store the potentially malicious image pattern as a historical malicious image pattern (e.g., at a malicious image pattern storage repository of pattern storage repository 108).

In some examples, based on an image pattern status corresponding to the potentially malicious image pattern and identifying the potentially malicious image pattern as a safe image pattern, the pattern recognition platform 102 may proceed to update the pattern matching engine (e.g., as described below at step 216) and might not perform the functions described at step 215.

At step 215, based on an image pattern status corresponding to the potentially malicious image pattern and identifying the potentially malicious image pattern as a malicious image pattern, the pattern recognition platform 102 may initiate a security action. For example, the pattern recognition platform 102 may initiate a security action responsive to detected botnet attacks. In some examples, in initiating the security action, the pattern recognition platform 102 may generate a security alert (e.g., a botnet alert, a malware alert, and/or other alerts) indicating that a cybersecurity threat has initiated an attack (e.g., a polymorphic botnet attack, and/or other attacks) on a component of the network 101. For instance, the pattern recognition platform 102 may generate an alert indicating that the potentially malicious image pattern represents a polymorphic botnet attack, based on the image pattern status identifying the potentially malicious image pattern as a malicious image pattern. In these instances, the botnet alert may include one or more botnet signatures (e.g., of the botnet signature retrieved at step 202, and/or other signatures) corresponding to the one or more historical malicious image patterns compared to the potentially malicious image pattern by the pattern matching engine. By including the one or more botnet signatures, the botnet alert may provide a historical record of previous mutations of the polymorphic botnet corresponding to the potentially malicious image pattern.

In some examples, in initiating the security action, the pattern recognition platform 102 may output the security alert to one or more entities. For instance, in some examples, the pattern recognition platform 102 may output the security alert by sending a security report containing the security alert to a cybersecurity platform (e.g., cybersecurity platform 110, and/or other cybersecurity platforms). For example, the pattern recognition platform 102 may send the security report via the wireless communication interface 113 and while the first wireless data connection is established. In some instances, the security report may include one or more additional security alerts previously generated by the pattern recognition platform 102 in response to previous input of additional potentially malicious image patterns into the pattern matching engine.

Additionally or alternatively, in some instances, the pattern recognition platform 102 may output the security alert by sending the security alert to the user device 106 (e.g., via an established wireless data connection. In some examples, in sending the security alert to the user device 106, the pattern recognition platform 102 may send one or more display commands directing the user device 106 to display a user interface. Based on or in response to the one or more display commands, the user device 106 may display the user interface. For example, the user device 106 may display a botnet alert interface.

Figure 3:
FIG. 3 depicts an illustrative graphical user interface depicting an example alert generated in response to detecting polymorphic botnets using an image recognition platform in accordance with one or more example arrangements.

For instance, in displaying the botnet alert interface, the user device 106 may display a graphical user interface similar to botnet alert interface 300, which is illustrated in FIG. 3. Referring to FIG. 3, in some instances, the botnet alert interface 300 may include information corresponding to the potentially malicious image pattern and the corresponding image pattern status. For example, the botnet alert interface 300 may include information such as a notification that a malicious image pattern was detected by the pattern recognition platform 102, a target (e.g., a user device (such as user device 106, and/or other user devices), an application, and/or other potential targets of botnet attacks) impacted by a botnet corresponding to the malicious image pattern, a network and/or platform (e.g., network 101, SaaS platform 104, and/or other networks or platforms) impacted by the botnet corresponding to the malicious image pattern, a resource (e.g., a virtual resource, such as one stored on SaaS platform 104, and/or other resources) impacted by the botnet corresponding to the malicious image pattern, a suggested remedy (e.g., an additional security action, and/or other remedies), and/or other information. The botnet alert interface 300 may also display interface elements or selectable options requesting user input. For example, the botnet alert interface 300 may display one or more of: an information entry field, a button or buttons, toggle or toggles, check box or boxes, and/or other interface elements. For example, as illustrated in FIG. 3, the interface elements may be one or more buttons the user might toggle to initiate a suggested remedy. In some instances, based on user input initiating a suggested remedy, the user device 106 may send one or more notifications to the pattern recognition platform 102 indicating that the user provided input directing the user device 106 to initiate a suggested remedy. For example, the user device 106 may send the one or more notifications to the pattern recognition platform 102 via the wireless communication interface 113.

Referring back to step 215 of FIG. 2D, in some instances, in initiating the security action, the pattern recognition platform 102 may additionally or alternatively initiate a segmentation process. For example, the pattern recognition platform 102 may initiate a segmentation process to isolate user device 106 from the SaaS platform 104 and/or from the network 101 based on the potentially malicious image pattern indicating that user device 106 is subject to a botnet attack. In some instances, the pattern recognition platform 102 may initiate the segmentation process based on receiving one or more notifications from user device 106 indicating that the user of user device 106 provided input directing the user device 106 to initiate a suggested remedy (e.g., as described above with respect to FIG. 3). In segmenting the user device 106 from the SaaS platform 104 and/or from the network 101, the pattern recognition platform 102 may block all network traffic of network 101 to and/or from user device 106, such as by assigning user device 106 to an isolated private network, and/or by other methods. Additionally, in some instances, after segmenting user device 106, the pattern recognition platform 102 may apply one or more rules to the user device 106. For example, the user device 106 may apply one or more cybersecurity rules (e.g., rules affecting packet processing, authentication procedures, forced login/logouts, and/or other cybersecurity rules) configured to prevent and/or remedy botnet attacks. In some instances, based on applying the one or more cybersecurity rules, the pattern recognition platform 102 may determine whether malicious software (e.g., botnet attacks, and/or other malicious software) associated with the potentially malicious image pattern has been neutralized. For example, based on the potentially malicious image pattern indicating a polymorphic botnet attack, the pattern recognition platform 102 may determine whether the one or more cybersecurity rules prevent the user device 106 from receiving traffic from one or more devices associated with the botnet, and/or other determinations that the malicious software has been neutralized. In some instances, based on a determination that the malicious software has been neutralized, the pattern recognition platform 102 may reintroduce the user device 106 to the network 101 and/or the SaaS platform 104 (e.g., by allowing the user device 106 to communicate with the SaaS platform 104, and/or by other means). It should be understood that while the above description relates to the user device 106, the pattern recognition platform 102 may perform the functions described above with respect to one or more additional user devices included in network 101 and/or with respect to one or more platforms (such as SaaS platform 104, and/or other platforms) without departing from the scope of this disclosure.

At step 216 the pattern recognition platform 102 may refine, validate and/or otherwise update the pattern matching engine using a potentially malicious image pattern and the corresponding image pattern status (e.g., the potentially malicious image pattern and corresponding image pattern status described above at step 213). In some instances, updating the pattern matching engine may include inputting the potentially malicious image pattern into the pattern matching engine. By inputting the potentially malicious image pattern into the pattern matching engine, the pattern recognition platform 102 may create an iterative feedback loop that may continuously and dynamically refine the pattern matching engine to improve its accuracy. For example, based on inputting a potentially malicious image pattern and corresponding image pattern status indicating the potentially malicious image pattern is a malicious image pattern, the pattern recognition platform 102 may cause the pattern matching engine to determine future image pattern statuses for future potentially malicious image patterns by comparing the future potentially malicious image patterns to the malicious image pattern. Additionally or alternatively, based on inputting a potentially malicious image pattern and corresponding image pattern status indicating the potentially malicious image pattern is a safe image pattern, the pattern recognition platform 102 may cause the pattern matching engine to determine future image pattern statuses for future potentially malicious image patterns by comparing the future potentially malicious image patterns to the safe image pattern.

In updating the pattern matching engine, the pattern recognition platform 102 may improve the accuracy and effectiveness of the image pattern status generation process of the pattern matching engine, which may, e.g., result in more efficient training of machine learning models trained by the pattern recognition platform 102 (and may in some instances, conserve computing and/or processing power/resources in doing so).

Figure 4:
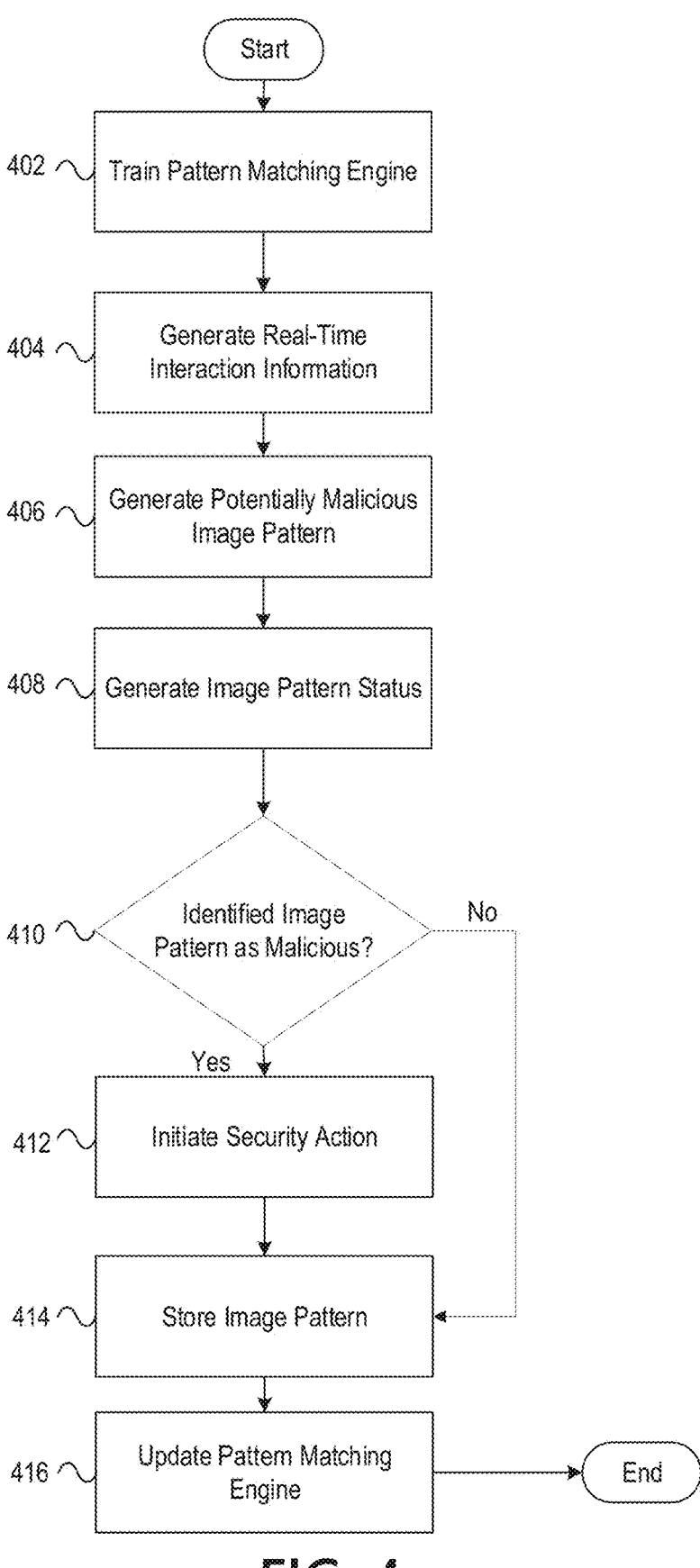
FIG. 4 depicts an illustrative method for detecting polymorphic botnets using an image recognition platform in accordance with one or more example arrangements.

FIG. 4 depicts an illustrative method for detecting polymorphic botnets using a pattern matching engine in accordance with one or more example arrangements. Referring to FIG. 4, at step 402, a computing platform having at least one processor, a communication interface, and memory may train a machine learning model. For example, the computing platform may train a pattern matching engine. At step 404, the computing platform may generate real-time interaction information based on interactions between two or more devices or systems and monitored or captured by the computing platform. At step 406, computing platform may generate a potentially malicious image pattern based on the real-time interaction information. At step 408, the computing platform may generate an image pattern status based on inputting the potentially malicious image pattern into the pattern matching engine and executing the machine learning model. At step 410, the computing platform may determine whether the potentially malicious image pattern was identified as malicious (e.g., by the machine learning model). Based on a determination that the potentially malicious image pattern was identified as malicious, the computing platform may proceed to step 412. Based on a determination that the potentially malicious image pattern was not identified as malicious, the computing platform may proceed to step 414.

At step 412, the computing platform may initiate a security action. At step 414, the computing platform may store the potentially malicious image pattern. At step 416, the computing platform may update the pattern matching engine based on the potentially malicious image pattern and the image pattern status.

One or more aspects of the disclosure may be embodied in computer-usable information or computer-executable instructions, such as in one or more program modules, executed by one or more computers or other devices to perform the operations described herein. Generally, program modules include routines, programs, objects, components, information structures, and the like that perform particular tasks or implement particular abstract information types when executed by one or more processors in a computer or other information processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular information structures may be used to more effectively implement one or more aspects of the disclosure, and such information structures are contemplated to be within the scope of computer executable instructions and computer-usable information described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing information or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to information being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to information being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, based on a training set of historical image patterns stored in at least one pattern database, a pattern matching engine to generate image pattern statuses, wherein the training set comprises a plurality of historical malicious image patterns and a plurality of historical safe image patterns, wherein a given historical image pattern comprises historical interaction information for a cloud-based network;
automatically generate real-time interaction information based on monitoring interactions between a first user device and a cloud platform;
generate, using a consolidation unit, a first potentially malicious image pattern based on the real-time interaction information, wherein the consolidation unit is configured to consolidate interaction information corresponding to the first user device and interaction information corresponding to the cloud platform into an image pattern comprising a heat map of at least a portion of the real-time interaction information;

input the first potentially malicious image pattern into the pattern matching engine to generate an image pattern status for the first potentially malicious image pattern, wherein generating the image pattern status comprises comparing a first central processing unit (CPU) usage corresponding to the first potentially malicious image pattern to a second CPU usage corresponding to at least one historical image pattern;

identify, based on the comparing, that the first potentially malicious image pattern is a malicious image pattern, and automatically in response:

store the first potentially malicious image pattern at a malicious pattern database; and initiate at least one security action responsive to malicious image patterns; and update, using the first potentially malicious image pattern and the image pattern status for the first potentially malicious image pattern, the pattern matching engine, wherein updating the pattern matching engine causes the pattern matching engine to determine one or more additional image pattern statuses based on the image pattern status for the first potentially malicious image pattern.

2. The computing platform of claim 1, wherein the memory stores additional computer-readable instructions that, when executed by the at least one processor, cause the computing platform to:

retrieve at least one signature of a known botnet from a cybersecurity platform;

input the at least one signature into a pattern creation engine to generate at least one known malicious image pattern; and store the at least one known malicious image pattern at the at least one pattern database.

3. The computing platform of claim 1, wherein the memory stores additional computer-readable instructions that, when executed by the at least one processor, cause the computing platform to:

generate a second potentially malicious image pattern based on the real-time interaction information;

determine an image pattern status for the second potentially malicious image pattern based on inputting the second potentially malicious image pattern into the pattern matching engine;

store, based on a determination that the second potentially malicious image pattern is a safe image pattern, the second potentially malicious image pattern at a safe pattern database; and update the pattern matching engine, wherein updating the pattern matching engine further causes the pattern matching engine to determine the one or more additional image pattern statuses based on the image pattern status for the second potentially malicious image pattern.

4. The computing platform of claim 1, wherein the instructions, when executed, cause the computing platform to monitor interactions between the first user device and the cloud platform by:

receiving interaction information from a custom agent previously installed by the computing platform on a virtual resource of the cloud platform.

5. The computing platform of claim 1, wherein the real-time interaction information comprises at least one of:

network traffic packet information;

network flow information;

network authentication information; or processing parameters of the first user device.

6. The computing platform of claim 1, wherein the instructions, when executed, cause the computing platform to initiate the at least one security action by:

generating a security alert comprising a signature of a known botnet corresponding to at least one historical malicious image pattern of the plurality of historical malicious image patterns; and outputting the security alert, wherein outputting the security alert comprises at least one of:

sending a security report comprising the security alert to a cybersecurity platform; or causing the first user device to display the security alert.

7. The computing platform of claim 1, wherein the instructions, when executed, cause the computing platform to initiate the at least one security action by:

segmenting the first user device from the cloud platform;

applying one or more cybersecurity rules to the first user device;

determining, based on applying the one or more cybersecurity rules, whether malicious software associated with the first potentially malicious image pattern has been neutralized; and reintroducing, based on a determination that the malicious software has been neutralized, the first user device to the cloud platform.

8. The computing platform of claim 1, wherein the real-time interaction information is further generated based on monitoring interactions between a plurality of additional user devices and the cloud platform.

9. The computing platform of claim 1, wherein the instructions, when executed, cause the computing platform to generate the image pattern status further by:

generating, based on further comparing the first potentially malicious image pattern to the at least one historical image pattern, a similarity score; and based on comparing the similarity score to one or more thresholds, determining the image pattern status.

10. The computing platform of claim 1, wherein the at least one security action comprises outputting a historical record of previous mutations of a polymorphic botnet corresponding to the first potentially malicious image pattern.

11. A method comprising:

at a computing device comprising at least one processor, a communication interface, and memory:

training, based on a training set of historical image patterns stored in at least one pattern database, a pattern matching engine to generate image pattern statuses, wherein the training set comprises a plurality of historical malicious image patterns and a plurality of historical safe image patterns, wherein a given historical image pattern comprises historical interaction information for a cloud-based network;

automatically generating real-time interaction information based on monitoring interactions between a first user device and a cloud platform;

generating, using a consolidation unit, a first potentially malicious image pattern based on the real-time interaction information, wherein the consolidation unit is configured to consolidate interaction information corresponding to the first user device and interaction information corresponding to the cloud platform into an image pattern comprising a heat map of at least a portion of the real-time interaction information;

inputting the first potentially malicious image pattern into the pattern matching engine to generate an image pattern status for the first potentially malicious image pattern, wherein generating the image pattern status comprises comparing a first central processing unit (CPU) usage corresponding to the first potentially malicious image pattern to a second CPU usage corresponding to at least one historical image pattern;

identifying, based on the comparing, that the first potentially malicious image pattern is a malicious image pattern, and automatically in response:

storing the first potentially malicious image pattern at a malicious pattern database; and initiating at least one security action responsive to malicious image patterns; and updating, using the first potentially malicious image pattern and the image pattern status for the first potentially malicious image pattern, the pattern matching engine, wherein updating the pattern matching engine causes the pattern matching engine to determine one or more additional image pattern statuses based on the image pattern status for the first potentially malicious image pattern.

12. The method of claim 11, further comprising:

retrieving at least one signature of a known botnet from a cybersecurity platform;

inputting the at least one signature into a pattern creation engine to generate at least one known malicious image pattern; and storing the at least one known malicious image pattern at the at least one pattern database.

13. The method of claim 11, further comprising:

generating a second potentially malicious image pattern based on the real-time interaction information;

determining an image pattern status for the second potentially malicious image pattern based on inputting the second potentially malicious image pattern into the pattern matching engine;

storing, based on a determination that the second potentially malicious image pattern is a safe image pattern, the second potentially malicious image pattern at a safe pattern database; and updating the pattern matching engine, wherein updating the pattern matching engine further causes the pattern matching engine to determine the one or more additional image pattern statuses based on the image pattern status for the second potentially malicious image pattern.

14. The method of claim 11, wherein the initiating the at least one security action comprises:

generating a security alert comprising a signature of a known botnet corresponding to at least one historical malicious image pattern of the plurality of historical malicious image patterns; and outputting the security alert, wherein outputting the security alert comprises at least one of:

sending a security report comprising the security alert to a cybersecurity platform; or causing the first user device to display the security alert.

15. The method of claim 11, wherein the initiating the at least one security action comprises:

segmenting the first user device from the cloud platform;

applying one or more cybersecurity rules to the first user device;

determining, based on applying the one or more cybersecurity rules, whether malicious software associated with the first potentially malicious image pattern has been neutralized; and reintroducing, based on a determination that the malicious software has been neutralized, the first user device to the cloud platform.

16. One or more non-transitory computer-readable media storing instructions that, when executed by a computing platform comprising at least one processor, a communication interface, and memory, cause the computing platform to:

train, based on a training set of historical image patterns stored in at least one pattern database, a pattern matching engine to generate image pattern statuses, wherein the training set comprises a plurality of historical malicious image patterns and a plurality of historical safe image patterns, wherein a given historical image pattern comprises historical interaction information for a cloud-based network;

automatically generate real-time interaction information based on monitoring interactions between a first user device and a cloud platform;

generate, using a consolidation unit, a first potentially malicious image pattern based on the real-time interaction information, wherein the consolidation unit is configured to consolidate interaction information corresponding to the first user device and interaction information corresponding to the cloud platform into an image pattern comprising a heat map of at least a portion of the real-time interaction information;

input the first potentially malicious image pattern into the pattern matching engine to generate an image pattern status for the first potentially malicious image pattern, wherein generating the image pattern status comprises comparing a first central processing unit (CPU) usage corresponding to the first potentially malicious image pattern to a second CPU usage corresponding to at least one historical image pattern;

identify, based on the comparing, that the first potentially malicious image pattern is a malicious image pattern, and automatically in response:

store the first potentially malicious image pattern at a malicious pattern database; and initiate at least one security action responsive to malicious image patterns; and update, using the first potentially malicious image pattern and the image pattern status for the first potentially malicious image pattern, the pattern matching engine, wherein updating the pattern matching engine causes the pattern matching engine to determine one or more additional image pattern statuses based on the image pattern status for the first potentially malicious image pattern.

17. The one or more non-transitory computer-readable media of claim 16 storing instructions that, when executed, further cause the computing platform to:

retrieve at least one signature of a known botnet from a cybersecurity platform;

input the at least one signature into a pattern creation engine to generate at least one known malicious image pattern; and store the at least one known malicious image pattern at the at least one pattern database.

18. The one or more non-transitory computer-readable media of claim 16 storing instructions that, when executed, further cause the computing platform to:

generate a second potentially malicious image pattern based on the real-time interaction information;

determine an image pattern status for the second potentially malicious image pattern based on inputting the second potentially malicious image pattern into the pattern matching engine;

store, based on a determination that the second potentially malicious image pattern is a safe image pattern, the second potentially malicious image pattern at a safe pattern database; and update the pattern matching engine, wherein updating the pattern matching engine further causes the pattern matching engine to determine the one or more additional image pattern statuses based on the image pattern status for the second potentially malicious image pattern.

19. The one or more non-transitory computer-readable media of claim 16 storing instructions that, when executed, further cause the computing platform to initiate the at least one security action by:

generating a security alert comprising a signature of a known botnet corresponding to at least one historical malicious image pattern of the plurality of historical malicious image patterns; and outputting the security alert, wherein outputting the security alert comprises at least one of:

sending a security report comprising the security alert to a cybersecurity platform; or causing the first user device to display the security alert.

20. The one or more non-transitory computer-readable media of claim 16 storing instructions that, when executed, further cause the computing platform to initiate the at least one security action by:

segmenting the first user device from the cloud platform;

applying one or more cybersecurity rules to the first user device;

determining, based on applying the one or more cybersecurity rules, whether malicious software associated with the first potentially malicious image pattern has been neutralized; and reintroducing, based on a determination that the malicious software has been neutralized, the first user device to the cloud platform.

\* \* \* \* \*